United States Patent Office 3,004,027
Patented Oct. 10, 1961

3,004,027
PROCESS FOR PURIFICATION OF 3,6-DICHLOROPYRIDAZINE
John Edson Gordon, Middlesex, Kenneth Goodemoot, Franklin Township, Somerset County, and Fred Bernard Dorf, Plainfield, N.J., assignors to American Cyanamid Company, New York, N.Y., a corporation of Maine
No Drawing. Filed May 1, 1957, Ser. No. 656,186
7 Claims. (Cl. 260—250)

This invention relates to an improved process for purifying 3,6-dichloropyridazine.

A recently developed sulfa drug, sulfamethoxypyridazine, which is described in U.S. Patent 2,712,012 has achieved marked success. The process of preparing this pharmaceutical involves a number of steps, starting with maleic anhydride. One of the intermediates in the chain of production is 3,6-dichloropyridazine. The sequence of reactions is as follows:

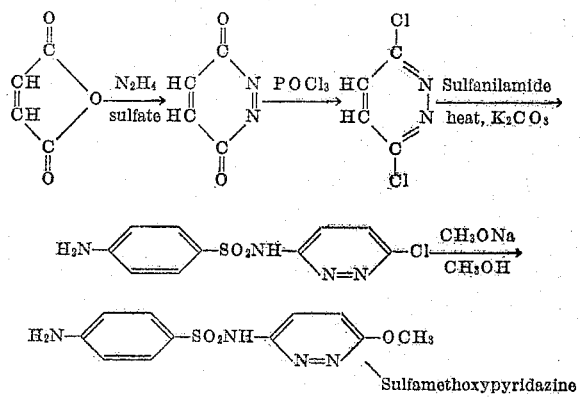

As the process requires many steps and a high degree of purity in the final product, yields are of utmost practical importance. When 3,6-dichloropyridazine of a very high degree of purity, preferably containing less than 2% of impurities, is used, a great saving in cost results due to the fact that the yields in the different steps with highly purified 3,6-dichloropyridazine are higher and the number of recrystallization steps in the final purification of the final drug is cut in half. As a result the over-all yields from maleic hydrazide, the product of the second step in the reaction set out above is more than ⅓ greater if higher purity dichloropyridazine is used. Also, there is at least one less step and the purity of the final product, as evidenced by color, is improved, even though fewer purification steps are used. The above statements with respect to yields and purity are based on full-scale commercial plant runs, for the present invention deals with an improvement in a step in a large-scale commercial process.

In the past, various attempts have been made to purify 3,6-dichloropyridazine. Ordinary procedures, such as recrystallization from aqueous alcohol, fail completely. In some instances the purity actually decreases. As a laboratory experiment, it was possible to obtain 3,6-dichloropyridazine by fractional distillation with or without added water. This laboratory procedure is completely impractical for large-scale use. Time cycles are long, yields are low, and the high degree of corrosion makes equipment costs prohibitive for plant use.

The present invention purifies impure 3,6-dichloropyridazine obtained by the chlorination of maleic hydrazide with phosphorus oxychloride, as shown in the third step of the sulfamethoxypyridazine synthesis set out above, by simply contacting with an aqueous solution of a sulfite, preferably an alkali metal or ammonium bisulfite. The bisulfite does not substantially increase the solubility in aqueous medium of the dichloropyridazine. However, it exerts a very great solubilizing action on the impurities. As a result 3,6-dichloropyridazine can be separated from a mother liquor in a form in which it is of a high degree of purity.

The mechanism of the action of the sulfite is not known. The impurities in the crude reaction mixture containing the 3,6-dichloropyridazine themselves are not definitely known, and the reaction of these impurities with the sulfites is also not known. Therefore, the present invention is not predicated on any theory of just how the sulfites solubilize the impurities; it is known that they do to a considerable extent.

The point of addition of the sulfites may vary. Thus, the crude reaction mixture of maleic hydrazide and phosphorus oxychloride, after drowning in ice and water, may receive the addition of the sulfite. Another point is after neutralization of the phosphorus oxychloride, which is usually effected with an alkali, preferably ammonia. Both modifications have advantages and disadvantages. The addition directly to the drowned mixture has the advantage of simplicity. If desired, a majority of the unreacted phosphorus oxychloride may be distilled off before drowning the reaction mixture. This makes some saving as the recovered phosphorus oxychloride may be reused.

Better still, if the sulfite treatment occurs after neutralization and isolation of crude material, the amount required is somewhat less as there is no reaction with acidic materials. On the other hand, when an isolated crude product is treated, it may be necessary to heat the material above the melting point of the dichloropyridazine and then add to a bisulfite solution. This is needed in some cases because with large crystal size there is insufficiently complete contact of the bisulfite with the impurities which may be mechanically held in the center of larger crystals. In general, the addition of the bisulfite to the drowned reaction mixture with or without preliminary removal of phosphorus oxychloride is preferred. In a large commercial operation this preferred modification is somewhat simpler and cheaper. However, the invention is not limited to the particular way in which the alkali metal bisulfite is contacted with the impurities associated with the dichloropyridazine.

Various alkali metal bisulfites may be used, for example ordinary sodium bisulfite, sodium meta-bisulfite or acidified sodium sulfite are very suitable. The bisulfite may also be formed in situ by introducing $SO_2$ at a suitable pH. The particular alkali metal in the bisulfite is of no importance. The corresponding potassium compounds act just as effectively, but because of the cheapness, the sodium bisulfites are preferred.

The amount of bisulfite to be used is also not critical. In general, it is desirable to use at least 10 parts of crude bisulfite per 100 parts of crude dichloropyridazine. If much smaller amounts are used, the risk is run of not having enough sulfite to solubilize the impurities and in such cases a 3,6-dichloropyridazine of lower purity is obtained. It is preferred to use between 15 and 35 parts of bisulfite per 100 parts of crude dichloropyridazine. Larger amounts of bisulfite, up to equal amount, give excellent results as far as purity of product is concerned, but the larger expenditure of bisulfite is ordinarily not justified.

While the invention is not limited to any particular method of determining the completeness of removal of impurities from 3,6-dichloropyridazine, the use of ultraviolet spectra as an analytical method presents many advantages, and in the specific examples to follow, this convenient method of analysis was used and analytical data as given are as shown by the ultraviolet analysis. The UV analytical method is conventional and no problems are raised with respect either to equipment or to procedure.

The invention will be described in greater detail in the following specific examples in which the parts are by weight unless otherwise specified.

*Example 1*

500 parts of a mixture from the reaction of maleic hydrazide and phosphorus oxychloride containing about 75 parts of 3,6-dichloropyridazine is drowned in 1500 parts of ice and water, the temperature being maintained below 30° C. To the drowned mixture there is added 750 parts of concentrated aqueous ammonium hydroxide solution, and 75 parts of sodium bisulfite is gradually added during the addition of the ammonium hydroxide. Temperature of the reaction mixture is maintained below 30° C. A slurry results which is cooled to about 10–15° C. and the dichloropyridazine removed by filtration. UV analysis shows that the dichloropyridazine contains 1.5% of impurities and the percentage yield based on maleic hydrazide is 75%.

The procedure is repeated, omitting the addition of the sodium bisulfite. The yield of crude dichloropyridazine drops slightly to 73.4% and the percentage of impurities increases to 8.28%. It will be noted that there is a very marked improvement in purity with no loss, in fact a slight gain, in yield.

*Example 2*

A reaction mixture obtained by reacting 300 parts of maleic hydrazide with 1680 parts of $POCl_3$ is distilled to remove recoverable phosphorus oxychloride. 133 parts of the remaining residue is then gradually added to an agitated mixture of 15 parts of sodium metabisulfite, 205 parts of concentrated ammonium hydroxide and 250 parts of water. During the addition the mixture is maintained at a temperature not exceeding 65–70° C., and the agitation is continued for a short time after the addition is complete. The mixture is then cooled slowly. At about 60° C. crystallization of 3,6-dichloropyridazine starts. Thereupon the cooling rate is increased and the mixture rapidly cooled to 10° C. The solid precipitate is removed by filtration, the pH of the filtrate being about 8.4. The yield of dichloropyridazine based on maleic hydrazide is 79% and the impurities present analyze by UV at 0.8%.

*Example 3*

500 parts of a reaction mixture such as is described in the foregoing example and containing 83 parts of dichloropyridazine is gradually added with agitation to 750 parts of ice, the temperature being maintained below 15° C. After all of the addition has taken place, 760 parts of concentrated ammonium hydroxide are added gradually. The temperature is maintained below 25° C. by the addition of ice.

After all of the ammonium hydroxide has been added, the pH of the mixture is about 6.6, and 75 parts of sodium metabisulfite is then added and the mixture warmed up to 60–65° C. and maintained until the reaction of the bisulfite with impurities is complete. The reaction is rapid and this requires only a short time. Then the mixture is allowed to cool slowly until 3,6-dichloropyridazine crystallizes. It is removed by filtration at 10° C. and represents a yield of 75%, based on maleic hydrazide. UV analysis shows 0.8% impurity.

*Example 4*

500 parts of a reaction mixture, such as described in the preceding examples and which contains 88 parts of 3,6-dichloropyridazine, is added gradually with agitation to 680 parts of concentrated ammonium hydroxide. Ice is added from time to time to maintain the temperature below 25° C. After the addition is complete, 15 parts of sodium metabisulfite are added and finally another 150 parts of concentrated ammonium hydroxide. Agitation is maintained throughout the further addition and for a short time thereafter until reaction of the bisulfite with impurities is complete. Thereupon the mixture is cooled to 7° C., 3,6-dichloropyridazine precipitating out. The precipitate is removed by filtration at the same low temperature and the yield is 79% based on maleic hydrazide. UV analysis shows 0.8% impurity.

*Example 5*

To a mixture of 750 parts there is added 75 parts of sodium chloride and 75 parts of sodium metabisulfite. Finally, 125 parts of finely divided crude 3,6-dichloropyridazine is added. The crude product by UV analysis shows an impurity content of just over 9%. After the addition, the mixture is agitated and warmed to 65° C., being maintained at this temperature for a short time until reaction with the impurities is complete. It is then cooled, 3,6-dichloropyridazine precipitated out and removed by filtration. The yield based on maleic hydrazide is 89.5% and the impurity content by UV analysis is 1.2%.

It will be noted that the sodium chloride exerts its usual salting-out effect and increases the recovery of dichloropyridazine; however, at a slight increase in impurity content.

We claim:

1. In recovering 3,6-dichloropyridazine from a reaction product obtained by the action of phosphorous oxychloride on maleic hydrazide, said reaction product containing a finite amount of residual unreacted phosphorous oxychloride, the improvement which permits recovery of said 3,6-dichloropyridazine containing not over 2% impurities, said improvement comprising the steps of drowning said reaction product in water, treating the resultant mass comprising drowned product in drowning liquor with at least 10 parts per hundred parts by weight of said reaction product of a water-soluble sulfite selected from the group consisting of the bisulfites, of sodium, potassium and ammonium, precipitating 3,6-dichloropyridazine from the so-treated mass and collecting resultant precipitate.

2. A process according to claim 1 in which part of the unreacted phosphorous oxychloride is distilled off before the crude product is drowned.

3. A process according to claim 1 in which the sulfite is sodium bisulfite.

4. A process according to claim 1 in which the contacting with the sulfite solution is effected by adding the sulfite to the drowned reaction mixture of phosphorous oxychloride and maleic hydrazide after neutralization of excess acidity.

5. A process according to claim 4 in which the sulfite is sodium bisulfite.

6. A process according to claim 4 in which the amount of sulfite is from 15–35 parts per 100 parts of crude product.

7. A process according to claim 6 in which the sulfite is from 15–35 parts of sodium bisulfite per 100 parts of crude product.

References Cited in the file of this patent

UNITED STATES PATENTS

| | | |
|---|---|---|
| 1,401,937 | Bailey | Dec. 27, 1921 |
| 2,846,433 | Pennino | Aug. 5, 1958 |

OTHER REFERENCES

Mizzoni: J. Am. Chem. Soc., vol. 73 (1951), page 1874.

Fieser and Fieser: Organic Chemistry, third ed., Reinhold Pub. Co., New York (1956), pp. 201–203.